Nov. 22, 1949 W. J. OLIE 2,488,824
CURRENT INTERRUPTION INDICATING
MEANS FOR ELECTRIC CLOCKS
Filed Aug. 17, 1946 2 Sheets-Sheet 1

INVENTOR.
WALTER J. OLIE
BY Richard E. Burn
ATTORNEY

INVENTOR.
WALTER J. OLIE
BY Richard E. Burn
ATTORNEY

Patented Nov. 22, 1949

2,488,824

UNITED STATES PATENT OFFICE 2,488,824

CURRENT INTERRUPTION INDICATING MEANS FOR ELECTRIC CLOCKS

Walter J. Olie, Pequabuck, Conn., assignor to Haydon Manufacturing Company, Inc., Forestville, Conn., a corporation of Connecticut Application August 17, 1946, Serial No. 691,221

5 Claims. (Cl. 177—311)

This invention relates to clocks or other timing devices driven by self-starting electric motors which are adapted to be connected to an alternating current of commercial power and has for its object the production of a simple inexpensive device, associated with the electric motor which drives the timing mechanism, to visually indicate that there has been a current interruption in the power supply and to thus caution the observer that the clock may not be on time.

A further object of the invention is to produce a signalling means which is mechanically actuated and therefore has no inherent buzz or hum as is often associated with the magnetic type of current interruption signal.

Figure 1:
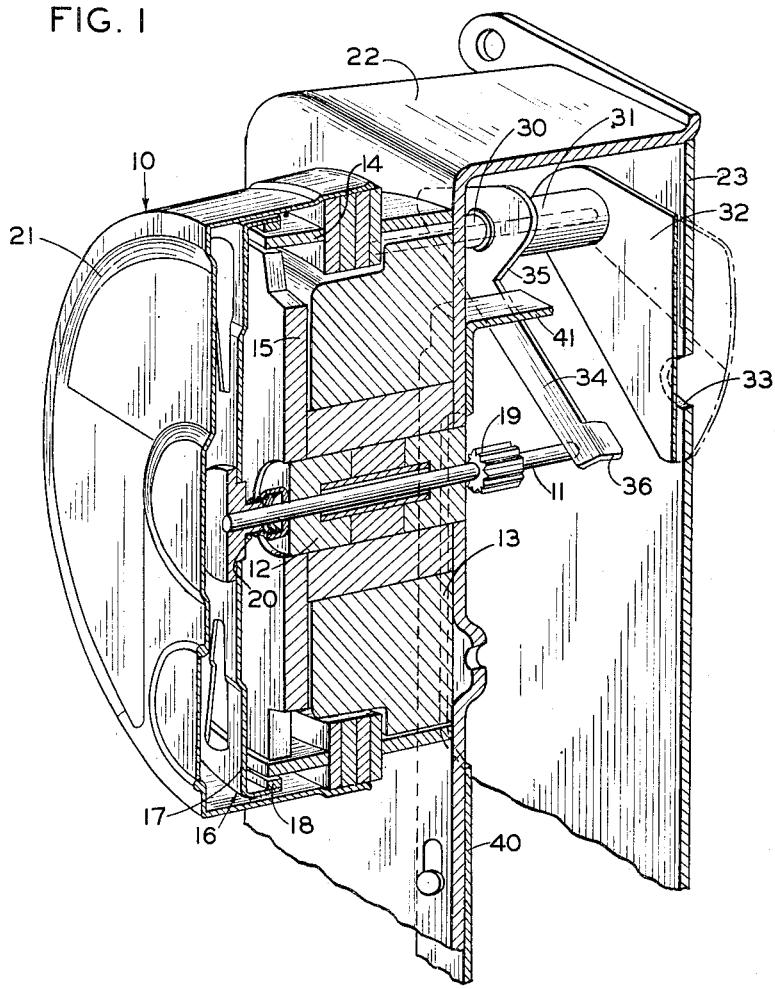
Figure 2:
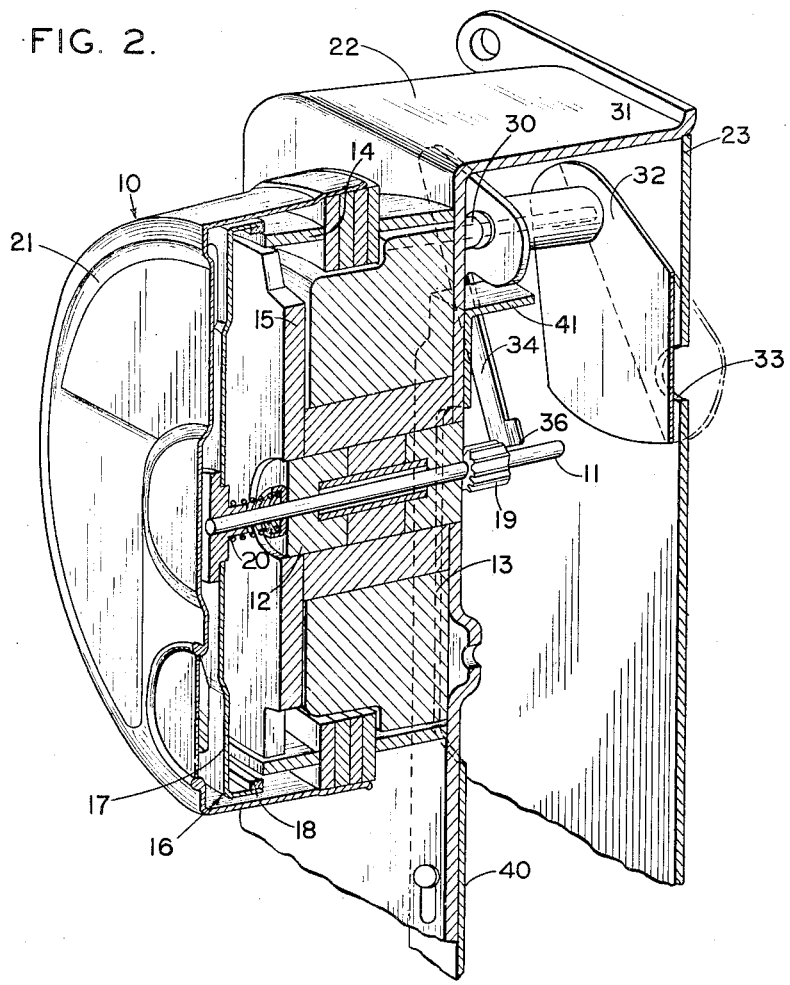

One embodiment of the invention is disclosed in the accompanying drawing in which:

Figure 1 is a perspective view partially in cross section of the improved indicator and the associated electric motor shown with the various parts in their correct positions when the clock is receiving current; and Figure 2 is a view similar to Figure 1 showing the positions assumed by the associated parts when the current has been interrupted.

In the drawing, 10 represents a self-starting synchronous motor which may be of the type disclosed in Patent No. 2,353,305 issued to Arthur William Haydon on January 11, 1944. This motor is disclosed in said patent so that it is unnecessary to fully describe it herein. The motor comprises a rotor shaft 11 mounted in bearings 12, said shaft being surrounded by an annular field coil 13. Pole pieces 14 and 15 are associated with said field coil 13 in a manner described in the above mentioned patent. A rotor 16 secured to shaft 11 is positioned at one end of the field assembly. The rotor comprises a spider 17 of lightweight material and a ring 18 of magnetic material. A pinion 19 affixed to rotor shaft 11 drives the hands of the clock or other indicating means through a train of gears, not shown.

Surrounding the rotor shaft 11 and positioned between bearing 12 and the center of rotor 16 is a compression spring 20, which tends to urge rotor 16 away from the field coils 13 to the position shown in Figure 2. A cover 21 encloses the rotor 16. A casing 22 and a dial plate 23 enclose the gearing and the indicating means.

Supported on the casing 22 parallel to and laterally displaced from the rotor shaft 11 is a signal shaft 30. A sleeve 31 rotatably mounted on shaft 30 has secured thereto at the end nearest the dial 23 a flat member 32 which comprises the visual signal. The signal is painted in two colors separated by the dotted line shown in the figures. For example, the upper half may be colored red and the lower half colored to match the dial plate 23. As shown in the drawing, the member 32 is over-balanced so that it will fall by gravity to the position shown in Figure 2 where the red portion will show through the aperture 33 in the dial plate unless said indicating member is supported. A lever 34 secured to the opposite end of sleeve 31 from the signal member 32 and adapted to rest on shaft 11 supports said signal.

When the motor 10 is receiving current the shaft 11 is urged to the right as shown in Fig. 1 by the magnetic attraction between the field pieces 14 and 15 and the rotor ring 18. With the shaft in its extreme right hand position, as shown in Fig. 1, the lever 34 is adapted to rest on said shaft and be supported thereby, and in turn through sleeve 31 support the indicator 32 affixed thereto. If, however, there is a current interruption so that the rotor is no longer magnetically attracted toward the field, spring 20 urges the rotor 16 and the shaft 11 secured to it to the extreme left hand position as shown in Fig. 2. In this position the right hand end of shaft 11 is to the left of lever 34 and said lever is unsupported. The lever 34 and signal 32 will therefore drop by gravity to the position shown in Fig. 2, with the red portion showing through aperture 33.

On the upper end of lever 34 is a projection 35 adapted to co-act with a re-setting lever 40 having a lateral arm 41 which extends under projection 35 and on which said projection is adapted to rest when the current is interrupted, as shown in Fig. 2. The opposite end of lever 34 from the projection 35 is bent toward the dial plate 23 to form a cam portion 36. This cam portion 36 is so designed that the extreme upper edge of said portion is always closer to the dial plate 23 than the end of rotor shaft 11. Therefore, when lever 40 is moved upward by the operator, arm 41 contacts projection 35 of lever 34 lifting lever 34 and the associated signal 32. If the motor 10 is receiving current so that the shaft 11 is in the right hand position as shown in Fig. 1, the cam portion 36 of lever 34 contacting the right end of shaft 11 will push the shaft 11 to the left until the lower edge of lever 34 has cleared said shaft at which time the shaft will again be returned to its extreme right hand position by the magnetic pull on the rotor. Lever 40 may be extended so that its outer extremity is below the case of the clock in which case the operator need merely press upward on it to re-set the indicator.

It will thus be seen that the invention comprises a simple inexpensive current interruption indicator which occupies a small space in a clock or other timing device. While it has been described for use in connection with the motor described in the above mentioned Haydon patent, it is obvious that it may be used with any other type of motor in which the rotor may be axially displaced from the field structure.

From the above description it is evident that when the motor is receiving current the rotor and rotor shaft are in the extreme right hand position as shown in the drawing supporting lever 34 and the associated signal 32. When the current is interrupted, the rotor is urged away from the field structure by the spring 20, as shown in Fig. 2 of the drawing, and the lever 34 and indicator 32 being no longer supported drop by gravity as shown. When the current supply has been resumed the signal will remain in the lower position until the re-setting lever 40 is lifted, thereby lifting lever 34 so that the cam action of portion 36 of said lever pushes the rotor shaft away from the dial plate and the lever 34 may pass the end of said shaft. Shaft 11, because of the magnetic attraction between the rotor and the field of the rotor, is then moved to the right, resuming the position shown in Fig. 1. When the resetting lever 40 is released the lever 34 will again rest on shaft 11.

It will be understood that while only one form of the invention has been described it is not limited to the form shown which may be taken as merely illustrative. The invention is limited in scope only by the appended claims.

What is claimed is:

1. In a timing device, an electric motor, means for producing a magnetic field in said motor from a source of current, a shaft mounted for rotary and axial movement in said field, a rotor secured to said shaft so that it is drawn toward said field when current is flowing, means to move said rotor axially away from said field when current ceases; in combination with a pivoted indicator and a lever secured to said indicator and pivotable therewith, said lever being adapted to rest on said shaft when the rotor is close to said field, thereby supporting said indicator in one position and to fall from said shaft when said rotor is moved away from said field allowing said indicator to assume a second position, said lever having a cam portion adapted to move said shaft axially when said lever is lifted.

2. In a timing device, an electric motor, means for producing a magnetic field in said motor from a source of current, a shaft mounted for rotary and axial movement in said field, a rotor secured to said shaft so that it is drawn toward said field when current is flowing, means to move said rotor axially away from said field when current ceases; in combination with a pivoted indicator and a lever secured to said indicator and pivotable therewith, said lever being adapted to rest on said shaft when the rotor is close to said field, thereby supporting said indicator in one position and to fall from said shaft when said rotor is moved away from said field allowing said indicator to assume a second position, said lever having a cam portion adapted to move said shaft axially when said lever is lifted, and means to lift said lever above said shaft.

3. A current interruption indicator for a timing device driven by an electric motor, said motor having a rotor shaft mounted therein for rotary and axial movement, the magnetic field of said motor normally holding said rotor shaft in one lateral position when said motor is receiving current; and means to shift said shaft to a second lateral position when said motor is not receiving current; comprising a member pivotable on an axis generally parallel to said rotor shaft, said member being adapted to rest on a said rotor shaft when said shaft is in said first position and to drop below said shaft when it is shifted to said second position, said member having a cam portion adapted to press against one end of said shaft thereby shifting it from said first position so that said member will clear the end of said shaft when said member is lifted; and a signal secured to said member and movable therewith.

4. A current interruption indicator for a timing device driven by an electric motor, said motor having a rotor shaft mounted therein for rotary and axial movement, the magnetic field of said motor normally holding said rotor shaft in one lateral position when said motor is receiving current, and resilient means to shift said shaft to a second lateral position when said motor is not receiving current; comprising a pivoted member positioned to be supported on said rotor shaft when it is in said first position and to drop below said shaft when it is shifted to said second position, said member having a projection on one end thereof and a cam portion on the other end thereof, said cam portion being adapted to shift said rotor shaft from said first position when said member is lifted; resetting means co-acting with said projection to lift said member; and a signal secured to said member and movable therewith.

5. In a clock having a dial with an opening therein, an electric motor, means for producing a magnetic field in said motor from a source of current, a shaft mounted for rotary and axial movement in said field, a rotor secured to said shaft so that it is drawn toward said field when current is flowing in the motor, and means to move said rotor axially away from said field when the said current is interrupted; in combination with a signal mounted in close proximity behind said dial opening and adapted to move in a plane parallel to the plane of said dial, a lever secured to said signal and movable therewith, said lever being adapted to rest on said shaft when the rotor is close to said field, thereby supporting said indicator in one position and to fall from said shaft when the rotor is moved away from said field allowing the indicator to assume a second position, said lever having a cam portion adapted to move said shaft axially when said lever is lifted, and means to lift said lever above said shaft.

WALTER J. OLIE.

REFERENCES CITED

The following references are of record in the file of this patent:

UNITED STATES PATENTS

| Number | Name | Date |
|---|---|---|
| 1,454,092 | Warren | May 8, 1923 |
| 1,615,664 | Warren | Jan. 25, 1927 |
| 1,955,155 | Toewe | Apr. 17, 1934 |
| 1,977,350 | Neureuther | Oct. 16, 1934 |
| 2,384,581 | Wiedemeier | Sept. 11, 1945 |